C. B. DAVIS.
BREWING APPARATUS.
APPLICATION FILED AUG. 12, 1912.

1,094,059.

Patented Apr. 21, 1914.

Attest:
Edna R. Moreland
Alan C. McDonnell

Inventor:
by Charles B. Davis
C. W. Scherr Jr. Atty.

UNITED STATES PATENT OFFICE.

CHARLES B. DAVIS, OF NEW YORK, N. Y.

BREWING APPARATUS.

1,094,059.

Specification of Letters Patent.

Patented Apr. 21, 1914.

Application filed August 12, 1912. Serial No. 714,567.

*To all whom it may concern:*

Be it known that I, CHARLES B. DAVIS, a citizen of the United States, residing at New York city, in the county of New York and State of New York, have invented certain new and useful Improvements in Brewing Apparatus, &c., of which the following is a specification.

My present invention relates to brewing apparatus, etc., and more specifically to apparatus for sieving or straining a liquid from solids. For example, in brewing, my improvements may be used with advantage in the mash-tun for straining the extract from the spent grains or husks.

The features and advantages of my improvements will be apparent to those skilled in the art from an understanding of the following description in connection with the drawings which show only two of the specific embodiments that my improvements are adapted to take.

Figure 1:
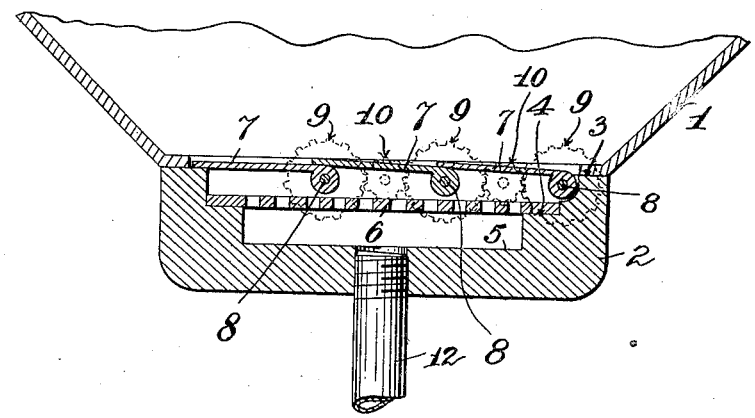
Figure 2:
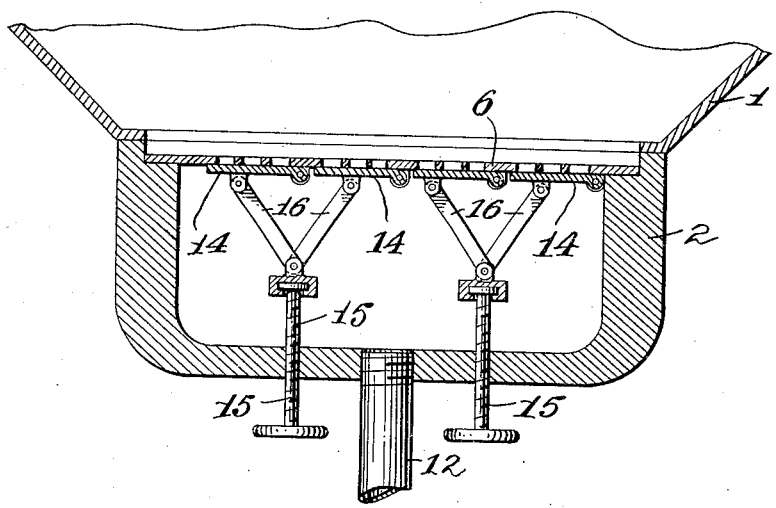

Figure 1 is a vertical section of a mash-tun having its bottom fitted with my improved sieve means; and Fig. 2 is a similar view of a modification.

I will now describe the devices of the drawings, reserving it to the claims to point out the novel features and to define the scope of the invention, it being understood that the claims will be given the due range of equivalents to which they may be entitled in view of the art.

Referring now primarily to Fig. 1, 1 is a mash-tun having a bottom portion 2 whose interior is provided with steps 3, 4 and 5, the last being the actual inside-bottom of the tun. 6 is a perforated plate or sieve supported on the step 4. Gate means is provided above the sieve consisting of a plurality of tilting plates 7 hinging about axes 8, the front edge of one plate being shown as overlapping the rear of the preceding plate when they have been hinged down into closed position. The plates can be opened and closed like the slats of a shutter or Venetian blind. The parts are shown merely diagrammatically in the drawings, but it will be seen that the means for operating the plates 7 consists of gears. Thus, there is a gear 9 rigid with the hinge-axis of each plate 7, and there is a gear 10 operatively supported between each pair of the gears 9 in mesh therewith. Obviously, rotating one of the gears in any appropriate manner results in simultaneously raising or lowering all of the plates 7 depending upon the direction of rotation of said gear. In the case of a mash-tun, the plates 7 are kept closed as shown in Fig. 1 during the mashing operation. They thereby guard the perforations in the sieve 6 from becoming clogged. On the other hand, after the mashing operation, these plates 7 are hinged into vertical position, which thereupon permits the extract to be strained off from the grains through the sieve 6 and out of the tun by way of the delivery pipe 12. Further, it is apparent that a variety of means for operating the guards might be adopted; furthermore, changes may be made in the size or shape of the plates; also they may be mounted below instead of above the sieve. This is shown in Fig. 2 where 1 is again the mash-tun and 6 the sieve. The gate means consists of a plate or plates 14 hinged to the underside of the sieve. 15, 15 are screws tapped vertically through the bottom of the tun, said screws having their free ends pivotally connected with the hinged plates 14 by the links 16 to hinge said plates at will to and away from the underside of the sieve. In this form of the device, the sieve perforations should be large because they are unprotected from above against clogging but it has the advantage that the opening of the gate does not disturb the mashing and said gate can be opened more readily.

I repeat that I have illustrated the devices only diagrammatically and modifications and changes might be made therein to accomplish the purpose of the invention without departing from its spirit.

What I claim is:

1. An apparatus for separating liquids from solids comprising a sieve; and a controlling gate comprising a plurality of hinged members, and means for operating them.

2. An apparatus for separating liquids from solids comprising a sieve; and a controlling gate comprising a plurality of hinged members and means for moving same into open and closed position.

3. An apparatus for separating liquids from solids comprising a sieve; and a controlling gate comprising a plurality of hinged members and means for hinging same into open and closed position, said gate-members being located below the sieve.

4. An apparatus for separating liquids from solids comprising a sieve; and a controlling gate comprising a plurality of hinged members and means for hinging same into open and closed position, said gate-members being located below the sieve, and when closed contacting with the underside of the sieve to seal the perforations thereof.

5. An apparatus for separating liquids from solids comprising a sieve; and a hinged controlling gate located below the sieve and means for operating same.

6. An apparatus for separating liquids from solids, comprising a sieve, and a pivoted gate adapted to be moved toward and from the sieve to open or close the apertures thereof.

In testimony whereof I affix my signature in presence of two witnesses.

CHARLES B. DAVIS.

Witnesses:
CHARLES H. WEAVER,
WM. C. ROGERS.

---

Copies of this patent may be obtained for five cents each, by addressing the "Commissioner of Patents, Washington, D. C."